3,544,625
METHOD FOR PRODUCING PERCHLOROMETHYL MERCAPTAN

Jan Masat, 13 Na Hanspaulce, Prague 6, Czechoslovakia, and Miroslav Zbirovsky, 47, 5 kvetna, Prague 4, Czechoslovakia
No Drawing. Filed Aug. 10, 1965, Ser. No. 478,753, Claims priority, application Czechoslovakia, Aug. 11, 1964, 4,535/64
Int. Cl. C07c *145/00*
U.S. Cl. 260—543     13 Claims

ABSTRACT OF THE DISCLOSURE

Perchloromethyl mercaptan is produced by reacting at a temperature between about 0 and 46° C. an agitated mixture of (a) chlorine, (b) a solution of at least one inorganic acid including hydrochloric acid at a concentration of between about 5 and 38% by weight, and (c) carbon disulfide, so as to chlorinate the carbon disulfide under formation of perchloromethyl mercaptan, followed by recovery of thus formed perchloromethyl mercaptan.

---

This invention relates to a method of making perchloromethyl mercaptan $Cl_3CSCl$. This compound has become an important intermediate in the manufacture of various industrial products, such as organic fungicides, additives to mineral oils, thiophosgene and others.

In commercial practice the methods of making this compound are all based on the original process developed by Rathke which consists in the chlorination of carbon disulfide by means of gaseous chlorine in the presence of added iodine. This method proceeds according to the equation:

$$CS_2 + 3Cl_2 \xrightarrow{/I_2/} Cl_3CSCl + SCl_2$$

The Rathke method has the disadvantage that in the chlorination there are formed substantial amounts of undesired by-products, such as sulfur chlorides, thiophosgene, tetrachloromethane, and others. This in turn causes a material lowering of the yield and also of the quality of the perchloromethyl mercaptan produced. Furthermore, it is extremely difficult and complicated to isolate and purify the desired end product. The yields actually vary substantially, the amounts being about 55% of the theoretical maximum if we figure the amount in relation to the carbon disulfide obtained in a batch operation while the figure amounts to about 70% of the theoretical yield if we base it on a partial conversion only of the carbon disulfide in the chlorination. In addition, this process results in the clogging up of the apparatus because of accumulation of sulfur and in the inconvenience that large amounts of toxic wastes have to be disposed of.

Various other methods have therefore been proposed but none of them has found acceptance in practice. Among these methods is for instance a method wherein a mixture of carbon disulfide, iodine and concentrated hydrochloric acid as well as manganese ore must be subjected to a shaking operation for several weeks.

Much attention has also been devoted to the purification of the perchloromethyl mercaptan obtained in the Rathke process. While this purification and isolation problem was rather successfully solved, the yield of the final product was not improved thereby.

An object of the present invention is therefore a method of producing perchloromethyl mercaptan at an improved yield.

A further object of the present invention is a method wherein a high yield is obtained of perchloromethyl mercaptan without undesirable by-products.

A further object of the present invention is a method as indicated which avoids the clogging up of the chemical apparatus, the problem of waste removal and the difficulties in isolating and purifying the product obtained.

These and other objects will be apparent from the following description of the invention.

The present invention is based on the finding that perchloromethyl mercaptan can be obtained with an improved yield and without the shortcomings of the prior art methods, in particular of the Rathke method, if perchloromethyl mercaptan is made by means of chlorination of carbon disulfide in the presence of a solution of inorganic acids, comprising hydrochloric acid in a concentration range between 5 and 38% and preferably between 15 and 30% by weight.

In carrying out the chlorination it is important that an intimate contact is obtained between the various immiscible reaction products, such as carbon disulfide, the hydrogen chloride containing acid solution and the chlorine itself. This contact can be obtained by forming an emulsion, for instance by mechanical means, such as stirring and agitation.

The reaction that takes place when carbon disulfide is chlorinated in this manner to form perchloromethyl mercaptan with simultaneous hydrolytic oxidative decomposition of the sulfur chlorides is best summarized in the following equation:

$$CS_2 + 5Cl_2 + 4H_2O \xrightarrow{/HCl/} Cl_3CSCl + H_2SO_4 + 6HCl$$

The chlorination of this reaction results in products which are free from sulfur chlorides and it gives a yield of 85 to 90% of the theoretical yield and a product of a high purity. It is only necessary to remove the residual dissolved chlorine and possibly certain amounts of unreacted carbon disulfide in order to employ the reaction product for further use.

This result was unexpected and surprising since the significance of the hydrochloric acid solution for the chlorination of carbon disulfide was not previously appreciated. The hydrogen chloride is actually the essential factor in the chlorination while the decomposition of the byproducts which form in the presence of water and chlorine takes place regardless of the amount of HCl.

The starting concentration of the hydrogen chloride in the acid solution is of particular significance, since it influences both the rate and the final outcome of the chlorination process as appears from the following comparative table which is set up relative to the chlorination of 1.5 mol of carbon disulfide:

| Starting concentrate of HCl | Time required for chlorination, hours | Yield of $Cl_3CSCl$, percent of theoretical yield calc. rel. to— | | Contents of impurities in the crude $Cl_3CSCl$ (distill. residue) |
|---|---|---|---|---|
| | | $CS_2$ | $Cl_2$ | |
| Weight percent: | | | | |
| 0 | 10 | 65 | 69 | 8 |
| 5 | 5.25 | 79 | 84 | 2 |
| 10 | 3.5 | 84 | 87 | 0.9 |
| 15 | 3 | 86 | 90 | 0.5 |
| 20 | 2.75 | 86 | 91 | 0.4 |

The concentration of hydrochloric acid is important also in connection with the increased stability of the resulting product against hydrolysis. The use of sulfuric acid or other inorganic acids in the mixture of acids is helpful in this connection.

A particular advantage of the new method is the unexpected and surprising selectivity of the carbon disulfide chlorination. The chlorination actually stops at the moment when the optimum results are obtained and does not continue towards the formation of tetrachloromethane, as was the case in the prior art methods.

Catalysts may be used in the method of the invention but the conventional chlorination catalysts such as iodine. iron and the like are more or less without effect. As catalysts which do accelerate the chlorination, particularly in the early phase, may be used polyvalent metals such as lead, molybdenum, tungsten, nickel or cobalt, preferably, in amounts of up to 5% in reference to the weight of the carbon disulfide. With these catalysts an acceleration of the reaction can be obtained by between 10 and 30%.

In order to homogenize the reaction components it is preferred to use a minor amount of an emulsifier for instance, up to 2% of the $CS_2$. This will again accelerate the chlorination process, particularly in the early phase.

Carbon disulfide can also be chlorinated advantageously if preformed perchloromethyl mercaptan is added at the beginning of the process in a ratio by volume of 1:0.5–2. This effect is due to the fact that perchloromethyl mercaptan does dissolve chlorine which in turn permits to increase the effective concentration of the chlorine used in the reaction. Other inert solvents may be used for similar purposes, for instance, chlorinated solvents.

It is advisable during the chlorination process to eliminate, to the extent possible, any free oxygen and even air which may be present in the gaseous chlorine because free oxygen and the oxygen of the air have an inhibitory effect which slows down the rate of the conversion and changes the normal course of the chlorination process.

A particular advantage of the new method is the easy separation of the reaction mixture which forms two immiscible layers when permitted to stand. It is then sufficient to separate the lower layer from the inorganic acid layer. The lower layer contains either only perchloromethyl mercaptan (in case of complete chlorination of the carbon disulfide) or it contains this substance dissolved in the unreacted portion of carbon disulfide if only partial chlorination is accomplished. The layer may also contain any optionally used solvents. The acids can then be easily separated from traces of dispersed perchloromethyl mercaptan and can again be used, for instance, in neutralizing reactions, metal pickling or recovery processes for hydrochloric and sulfuric acids, etc.

The chlorination process of the invention can be carried out within a wide temperature range. The reaction may actually proceed anywhere between the melting point and boiling point of the components of the reaction, that is between 0 and 46° C. Preferably the temperatures are around 30° C. Chlorination can be effected at normal or slightly elevated pressures and it can be effected both in a batch process and in a continuous process. In both cases either a partial or complete chlorination of the carbon disulfide may be accomplished.

The process can be carried out with various types of apparatus. Particularly effective are tower type reactors which may consist of a number of individual members through which the reaction mixture may pass in a single passage or in which all or only part of the reaction mixture may be recirculated, such as the part consisting of the mixture of carbon disulfide and perchloromethyl mercaptan after diminution of the acids.

For complete chlorination it is of advantage to use a single working cycle with a series of reactors. In the first stage of the operation part of the carbon disulfide should be chlorinated in a continuous passage up to a specific point. In the next stage chlorination is effected of the so far unreacted part of the carbon disulfide and this portion of the chlorination is then completed in a discontinuous or batch operation. Thus, the reactors in the final chlorination stage may be fed with batches of the product of the first stage reaction mixture.

In order to carry out the chlorination it is preferable to initially mix the carbon disulfide and the solution containing the hydrochloric acid in a concentration between 15–30% by weight. Since the original hydrochloric acid content increases during the reaction through formation of HCl and $H_2SO_4$ by hydrolytic-oxidative decomposition of the chlorination byproducts such as, sulfur chlorides, it is necessary to make provision that during the chlorination the upper concentration limit of HCl in the acid solution should not be exceeded. This upper limit is 38% by weight depending, however, on the type of chlorination process and on the concentration of $H_2SO_4$ which may be used as the additional acid in the solution. Above this maximum limit there takes place the escape of gaseous HCl from the acid solution.

Limitation at this amount can be obtained in various ways. When the carbon disulfide for instance is added at the beginning of the chlorination together with the HCl at the required concentration a sufficient amount of water may also be added to dilute the increasing contents of HCl so as to keep the HCl below the upper concentration limit during the continuing chlorination process. Another way is to mix the carbon disulfide initially with only part of the acid solution and then to increase the HCl content by continuous additions of acid or dilute acid and water to keep it below the upper concentration limit.

Additional carbon disulfide can be added during the course of the reaction together with the necessary amount of water for dilution purposes, for instance 500 to 600 grams per mole of carbon disulfide, this amount being figured on a 100% theoretically possible conversion.

It has already been pointed out that during the chlorination it is necessary to obtain an intimate contact between the various heterogeneous components of the reaction, to wit, the carbon disulfide, the acid solution containing the hydrochloric acid and the chlorine. This can be effected in the first place by mechanical means such as agitation, for instance mechanical agitators, turbomixers, dispergators, centrifugal pumps, vibration, stirring, causing the mixture to engage in a turbulent flow through piping, pumping it through narrow conduit, or by use of ultrasound generators, etc. Various of these means can of course also be combined.

The chlorination of carbon disulfide is an exothermic reaction and it must therefore be kept by cooling within the desirable optimum temperature. For instance, the reactor walls may be cooled by external or internal cooling means, such as special tubes carrying a cooling liquid, or by means of any combination of means. A certain amount of heat can be removed or the heat formation can be prevented by using liquid chlorine instead of gaseous chlorine.

The following examples will further illustrate the invention without the intention to limit the scope thereof.

EXAMPLE 1

690 ml. water and 114 grams of carbon disulfide were added to 310 ml. of a 36% concentration of hydrochloric acid. While stirring and cooling the mixture to a temperature between 28 and 30° C. chlorine was introduced at a rate sufficient to accomplish almost complete absorption. After 2½ hours the chlorination was complete. From the reaction mixture there was then separated the bottom layer of perchloromethyl mercaptan. This layer, after removal of the dissolved chlorine by means of air, etc., had a weight of about 246 grams. This corresponds to a yield of 88.6% figured relative to the carbon disulfide. The total content of perchloromethyl mercaptan in the end product varied around 95%, the balance being the slight amount of unreacted carbon disulfide, tetrachloromethane and trichloromethane sulfochloride.

EXAMPLE 2

456 grams of carbon disulfide and 0.5 grams of a nonionic emulsifier were added to 1,000 ml. of a 20% concentration hydrochloric acid. The emulsifier was the product of reaction of a condensate of ethylene oxide with a higher fatty acid. The mixture was then subjected to chlorination in the same manner as in Example 1 for about 1 hour. During an additional period of 3 hours of the proceeding chlorination there were added 2,100 ml. of acid solution containing 2% HCl. The product obtained contained 44 grams of unreacted carbon disulfide and 883 grams perchloromethyl mercaptan which corresponds to an 87% yield based on the carbon disulfide.

EXAMPLE 3

228 grams of carbon disulfide and 1 gram of lead acetate were added to a mixture of 750 ml. acid solution which mixture contained 17% by weight HCl and 6.5% by weight $H_2SO_4$. Chlorination was carried out during a period of 3 hours, under the same condition as in Example 2. During this time, 975 grams of water were added gradually for dilution purposes. There were obtained 473 grams of perchloromethyl mercaptan which amounts to a yield of 84.9%.

EXAMPLE 4

In this example a reactor was used provided with a lateral overflow. Into this reactor there were filled 9000 ml. of a 30% concentration of hydrochloric acid, 228 grams carbon disulfide and 560 grams of perchloromethyl mercaptan. Chlorination was then started while subjecting the mixture to stirring and cooling to a temperature between 28 and 32 degrees C. There were added an average of 76 grams carbon disulfide, 170 grams chlorine and 300 grams of water for dilution purposes during a period of 30 minutes. In this process the reaction mixture was permitted continuously to flow out of the reactor and during the stated reaction time there were obtained by separation of the acid solution an average of 120 grams of a solution containing carbon disulfide and perchloromethyl mercaptan. This solution contained approximately 70% by weight of perchloromethyl mercaptan and 30% by weight of carbon disulfide. The solution was then fed into a distillation apparatus to separate the carbon disulfide which in turn was recycled for further chlorination operation.

EXAMPLE 5

In this case a reactor with a lateral overflow was again used. There was fed into the reactor a mixture containing 4350 ml. of a solution comprising 25% by weight of HCl and 150 ml. carbon disulfide and 150 ml. perchloromethyl mercaptan. There were successively added during a period of 2½ hours during which the chlorination took place under the same conditions as in the previous examples: 445 ml. of carbon disulfide, 1475 grams of chlorine and 3860 ml. of water for dilution. During this period an amount 4980 ml. of reaction mixture flowed continuously from the reactor by overflow into the next reactor. This mixture was then subjected in the next reactor to final chlorination during a period of 2 hours and 20 minutes. Thus, 1261 grams of crude product was obtained. After removal of chlorine this product yielded 1258 grams of a product containing 94.7% perchloromethyl mercaptan. This amounts to a yield of 85.1% relative to the carbon disulfide and 88.6% relative to the chlorine. Both figures were based on the 445 ml. of carbon disulfide which were step by step introduced into the first continuous reactor.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing perchloromethyl mercaptan, comprising the steps of passing chlorine through a mixture of carbon disulfide and a solution of at least one inorganic acid including hydrochloric acid at a concentration between about 5 and 38% by weight at a temperature between about 0 and 46° C. and while agitating the solution so as to chlorinate said carbon disulfide and to form thereof perchloromethyl mercaptan; and recovering the thus formed perchloromethyl mercaptan.

2. A method as defined in claim 1, wherein the said reaction is carried out in the presence of a catalyst selected from the group consisting of lead, tungsten, molybdenum, cobalt and nickel.

3. A method as defined in claim 1, wherein an emulsifier of the non-ionic type is added to the solution in an amount up to 2% of the weight of said carbon disulfide.

4. A method as defined in claim 1, wherein said reaction is carried out in a continuous manner and additional amounts of carbon disulfide and water are added by increments to the initial amounts of carbon disulfide and of inorganic acid solution, while subjecting the mixture to the action of chlorine; and continuously draining part of the solution and recovering the perchloromethyl mercaptan from the withdrawn part of the solution.

5. A method as defined in claim 1, wherein said solution of at least one inorganic acid consists entirely of a hydrochloric acid solution.

6. A method as defined in claim 1, wherein said reaction is carried out with substantial exclusion of oxygen.

7. A method as defined in claim 1, wherein the starting concentration of said hydrochloric acid solution is between 15 and 30%.

8. A method as defined in claim 1, wherein said temperature is maintained by cooling said reaction mixture.

9. A method as defined in claim 1, wherein said temperature is between about 28 and 32° C.

10. A method as defined in claim 2, wherein said catalyst is present in an amount up to 5% of the weight of said carbon disulfide.

11. A method as defined in claim 1, wherein said reaction is carried out in the presence of a solvent for chlorine other than the reactants which solvent is inert with respect to the reactants and the reaction product.

12. A method as defined in claim 11, wherein said solvent is preformed perchloromethyl mercaptan in an amount equal to between about one-half and twice the volume of said carbon disulfide.

13. A method as defined in claim 1, wherein water is added during said reaction mixture in an amount sufficient to prevent a rise in the hydrochloride acid concentration to more than 38%.

References Cited

UNITED STATES PATENTS 2,759,969   8/1956   Jonas _____ 260—543H

OTHER REFERENCES

Helfrich et al., J. Am. Chem. Soc., vol. 43, pp. 591–594 (1921).

Houben-Weyl, Methoden der Organischen Chemiem, vol. 9, (4th ed. 1955), pp. 787–788.

LORRAINE A. WEINBERGER, Primary Examiner

E. J. GLEIMAN, Assistant Examiner